United States Patent [19]

Selby

[11] Patent Number: 5,848,864
[45] Date of Patent: Dec. 15, 1998

[54] COLOR CODED LOAD RESTRAINT

[75] Inventor: Ricky W. Selby, Danielson, Conn.

[73] Assignee: Keeper Corporation, North Windham, Conn.

[21] Appl. No.: 959,822

[22] Filed: Oct. 29, 1997

[51] Int. Cl.⁶ .................................................. B60P 7/06
[52] U.S. Cl. .......................................... 410/97; 410/118
[58] Field of Search ............................. 410/96, 97, 100,
410/117, 118; 24/130, 265 CD; 296/100.15,
100.16; 87/2

[56] References Cited

U.S. PATENT DOCUMENTS

| | | | |
|---|---|---|---|
| 2,854,931 | 10/1958 | Campbell | 410/118 |
| 3,486,723 | 12/1969 | Harrison | 410/118 |
| 4,900,204 | 2/1990 | Summers | 410/97 |
| 5,203,655 | 4/1993 | Persau | 410/3 |
| 5,328,310 | 7/1994 | Lockney | 410/97 |
| 5,458,447 | 10/1995 | Clason | 410/100 |
| 5,682,652 | 11/1997 | Brody et al. | 24/130 X |

FOREIGN PATENT DOCUMENTS 404002534  1/1992  Japan ...................................... 410/97

*Primary Examiner*—Stephen T. Gordon
*Attorney, Agent, or Firm*—M. P. Williams

[57] ABSTRACT

A cargo restraint or net is formed of black longitudinal stringers 8, 9, yellow lateral stringers 10, 11 and a pair of yellow loops 12, 13 fastened to the stringers. Each end of the stringers has an adjustable jam cleat-type hook 18 thereon. Various net configurations are shown.

8 Claims, 5 Drawing Sheets

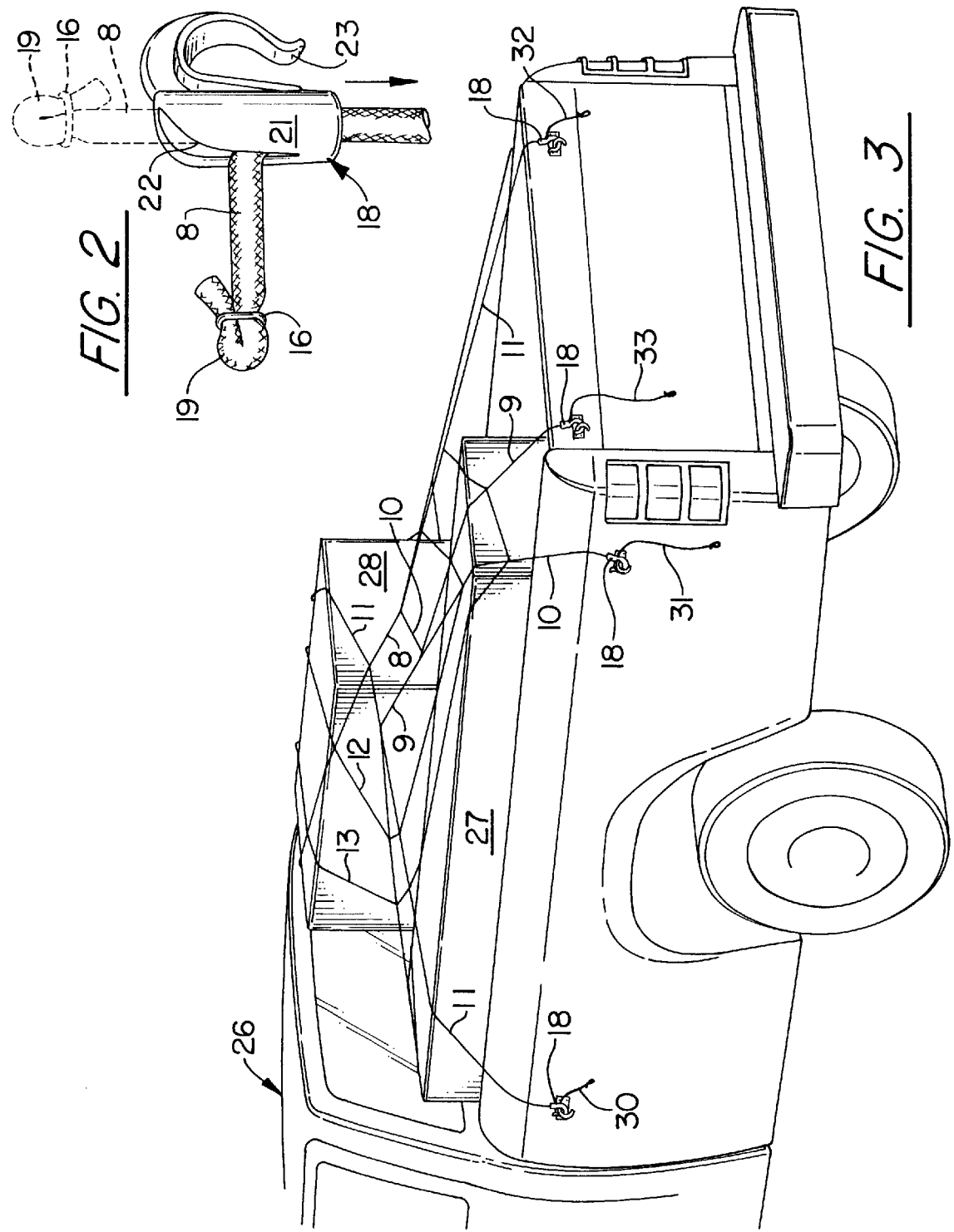

COLOR CODED LOAD RESTRAINT

TECHNICAL FIELD

This invention relates to load restraints formed of durable cord having longitudinal stringers of a first color and transverse stringers of a contrasting color.

BACKGROUND ART

A spider web shaped device for restraining cargo located in the bed of a truck or trailer is disclosed in U.S. Pat. No. 4,900,204. While that device is aesthetically appealing, there is such a large number of web elements, all of the elements looking alike, that it is extremely difficult to determine which is the longer of two dimensions, so as to orient the device properly on an elongated load, such as a pickup truck bed.

DISCLOSURE OF INVENTION

Objects of the invention include provision of a load restraint which is easily oriented with its long dimension parallel to the long dimension of a load.

Other objects of the invention include provision of a simple, lightweight, highly versatile easy-to-use cargo restraint.

According to the present invention, a cargo or load net or restraint comprises a plurality of longitudinal stringers formed of durable cord of a first color, a plurality of transverse stringers of a second color which is different from and contrasts with said first color, whereby the orientation of said net or restraint is easily determined, to facilitate installation on an oblong load or load support. In a preferred form, the invention is implemented with stringers which extend from end to end and at least one loop of durable elastic cord crossing said stringers and fastened thereto, and has adjustable hooks.

The invention, by use of color coded stringers, makes it very easy to align the cargo restraint, with the longitudinal stringers in the long dimension of the load or support, such as a truck bed, and the transverse stringers in the short dimension of the load or support.

Other objects, features and advantages of the present invention will become more apparent in the light of the following detailed description of exemplary embodiments thereof, as illustrated in the accompanying drawing.

BRIEF DESCRIPTION OF THE DRAWINGS

FIG. 2 is a side elevation view of an adjustable hook for use with the invention.

FIG. 3 is a perspective view of a truck bearing a load secured by a cargo net of the invention.

BEST MODE FOR CARRYING OUT THE INVENTION

Figure 1:
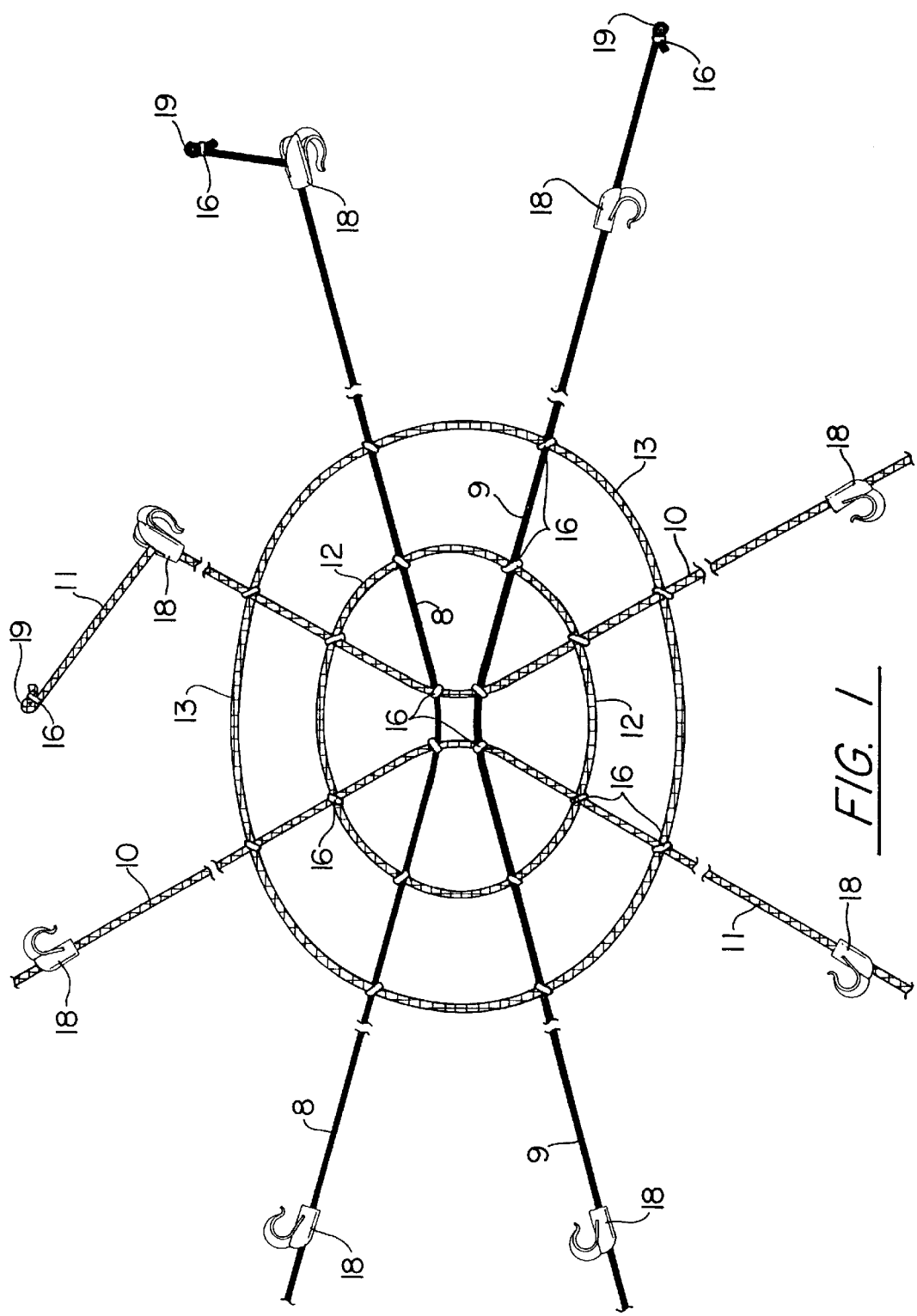
FIG. 1 is a plan view of a cargo net according to the invention.

Referring to FIG. 1, a cargo net of the invention is formed of durable cord and comprises a pair of longitudinal stringers 8, 9, a pair of transverse stringers 10, 11, and a pair of closed loops 12 13. The term "longitudinal" means the long way of a load, such as from front to back on a typical rectangular truck bed, and "transverse" means from side-to-side. The stringers and loops may preferably be made of high strength elastic cord, such as shock cord or bungee cord, the size of which may preferably be on the order of one quarter of an inch in diameter; of course, other sizes could be used. The stringers 8–11 are each connected at each point of crossing with each other and with the two loops 12, 13 by suitable attachment means, such as hog rings 16. Although not shown in FIG. 1, the loops 12, 13 may be formed by lapping the ends of a single piece and fastening them together by a suitable means, such as a hog ring. Each of the stringers has a jam cleat type of adjustable hook or clasp 18, which is prevented from sliding off the end of the stringer by means of a fist 19 formed by looping back the end of the stringer and fastening it to itself by any suitable attachment means, such as a hog ring 16. The fists 19 are shown in FIG. 1 only for the left ends of the stringers 8 and 9 and the upper end of the stringer 11, the ends of the remaining stringers having similar fists formed thereon.

According to the invention, the color of the longitudinal stringers 8, 9 is different from and contrasts with the color of the transverse stringers 10, 11. In FIG. 1, the stringers 8 and 9 are lined for the color black and the stringers 10 and 11, along with the loops 12 and 13, are lined for the color yellow. If desired, the colors could be reversed; other colors could be used; and the loops could have either a third color or the color of the stringers.

The hooks 18 are illustrated more clearly in FIG. 2. Each clasp 18 has a body 21 with a V-groove 22 therein, which forms a jam cleat, along with a hook 23 which is used to secure it to other hooks, eyes, edges, and the like. When the stringer 8 is in the position shown by dotted lines, the clasp 18 will slide easily along the stringer. But when the stringer 8 is drawn into the V-groove 22 as shown in solid lines, the stringer becomes locked in the V-groove, for so long as tension is applied in the direction of the arrow in FIG. 2. Clasps with other types of jam cleats may be used.

FIG. 3 shows a pickup truck 26 having a pair of crates 27, 28 therein. The stringers 8, 9 are attached to hooks behind the cab and on the tailgate of the truck, and the stringers 10, 11 are attached to hooks on the side of the truck. Because the tall crate 28 is in the front of the truck, the stringer 11 is shown with a very short tail 30 extending out of the clasp 18 on the front left side of the truck, whereas the stringer 10 has a very long tail 31 extending out of the clasp 18 on the rear left side of the truck. Similarly, because the tall crate 28 is on the right side of the truck, the stringer 8 has a short tail 32 extending outwardly of the clasp 18 at the right end of the tailgate, while the stringer 9 has a very long tail 33 extending out of the clasp 18 at the left end of the tailgate. The restraint may be hooked on the underside of the truck body rails, or in any other suitable way.

FIG. 3 illustrates that the positioning of the clasps along the stringers is adjustable. The adjustability feature gives rise to additional advantages. First, when the load is in place and the net has been installed, the operator can proceed around the load and individually adjust tension in each of the stringers 8–11, regardless of the positioning of the net. This also allows adjusting net tension with respect to the bed of the truck in a fashion to accommodate variously shaped loads. An additional advantage of the adjustable feature is that it is not necessary to preposition the net in any sort of a careful manner, hooking the front of the longitudinal stringers 8 and 9 in any suitable fashion can usually be accommodated simply by adjustments made to the other ends of the stringers 8 and 9, and to both ends of the stringers 10 and 11. The adjustable feature is claimed in a commonly owned copending U.S. patent application Ser. No. 08/960,027, filed on Oct. 29, 1997, contemporaneously herewith.

Although color is not shown in FIG. 3, it is obvious that the color of the invention facilitates placing the net properly on the load, with the longest, black stringers 8 and 9 extending from front to back on the load, and with the shorter yellow transverse stringers 10, 11 positioned from side-to-side on the load.

In the preferred embodiment, each stringer extends from one anchor point (a clasp 18) across the load to another anchor point. Between one clasp 18 and the other clasp 18 there is nothing except a single, continuous piece of bungee cord. This contrasts with the prior art spider web in which each radial stringer is attached both at the center and at the outer loop by being lapped around a ring or the like and joined to itself with a hog ring. The continuous cord feature is claimed in a commonly owned copending U.S. patent application Ser. No. 08/959,821, filed on Oct. 29, 1997, contemporaneously herewith.

In FIG. 1, the square formed between the stringers 8–11 is relatively small compared to the overall size of the cargo restraint. However, it is obvious that the stringers could be straightened up somewhat and the square made much larger by adjusting the point at which the various stringers are attached to one another. The restraint may have only one loop, when it is desired for the restraint to be simpler or smaller, or it may have three or more loops, when it is desired for the restraint to be larger or stronger. Similarly, various other configurations of one or more loops with four or more stringers can be utilized with the invention, as are shown in FIGS. 4–9, wherein fists 19 are not shown, the hog rings 16 are not shown in FIGS. 4–7, and the clasps 18 are only shown in FIG. 9.

Figure 6:
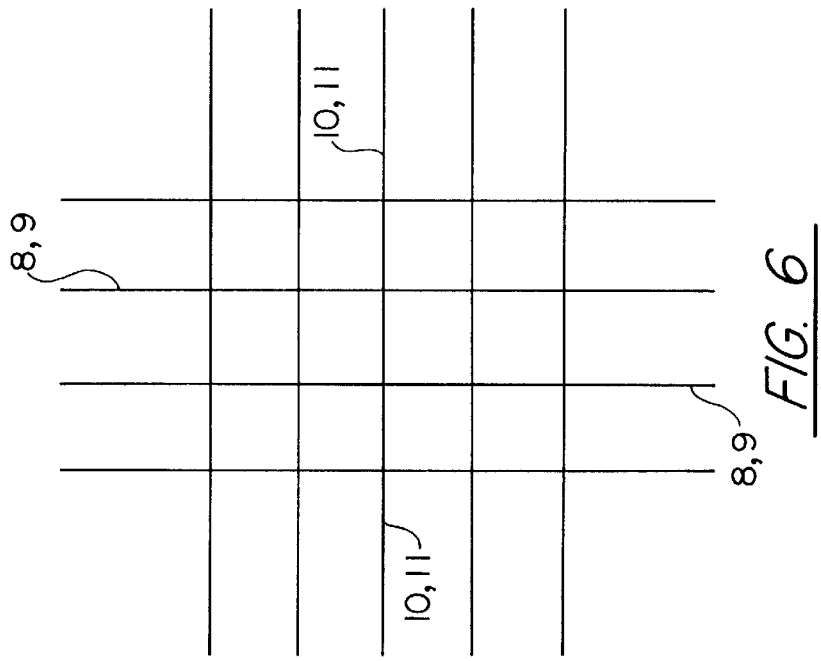
FIGS. 4–9 are stylized illustrations of alternative configurations for cargo restraints which may incorporate the present invention.
Figure 5:
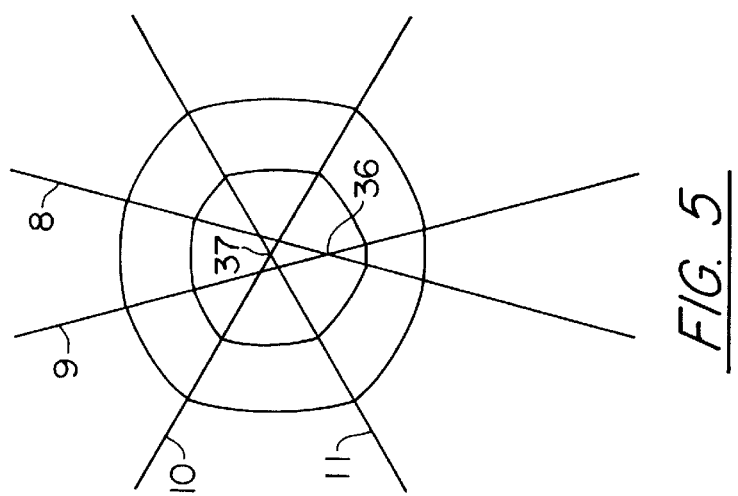
Figure 4:
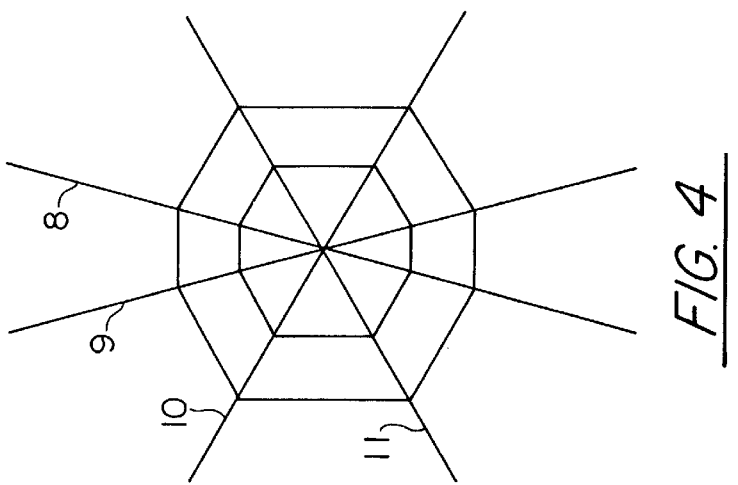
Figure 7:
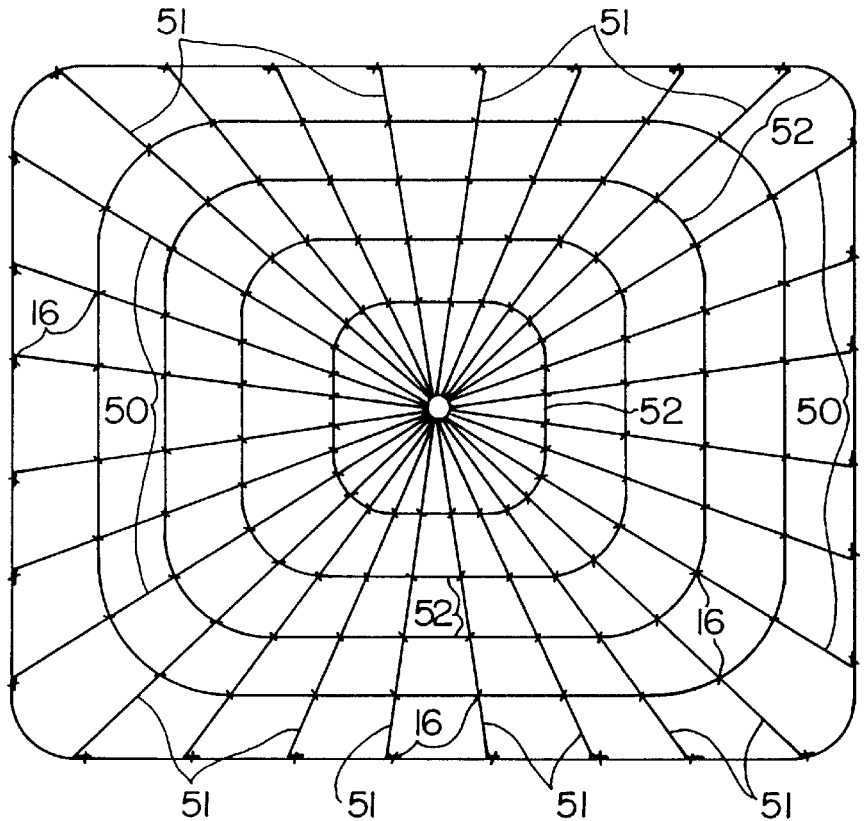
Figure 8:
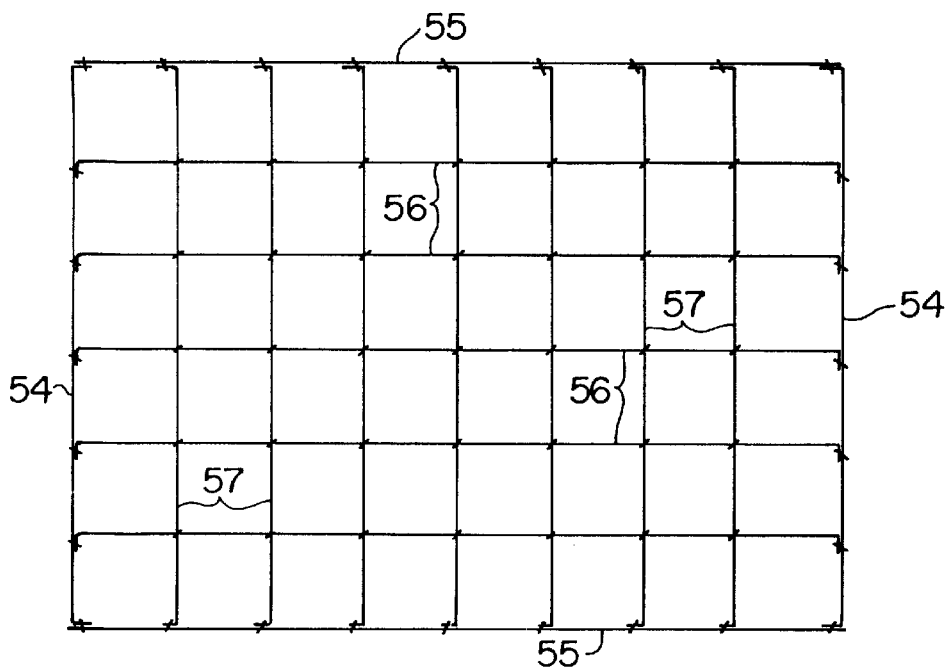
Figure 9:
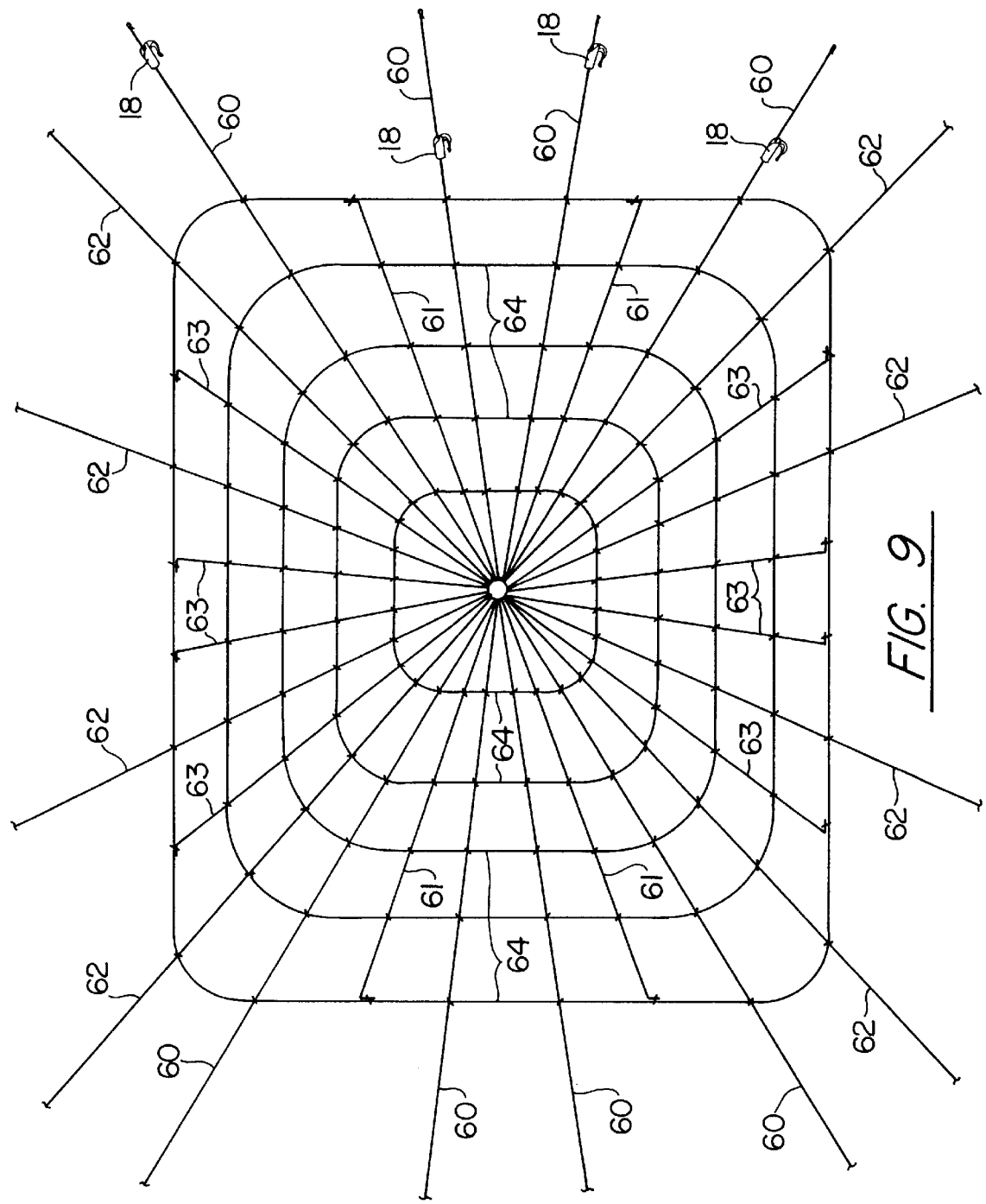

FIG. 4 illustrates a configuration like that of FIG. 1 except that all of the stringers 8–11 cross each other at a central point. FIG. 5 is similar to FIG. 4 except that the stringers 8, 9 cross each other at a first point 36 and the stringers 10, 11 cross each other at a point 37 which is displaced longitudinally from the point 36 to facilitate fastening no more than two cords together at any one point. Of course, the configuration could be with the longitudinal stringers 8, 9 crossing each other as in FIG. 4 while the transverse stringers 10, 11 do not cross each other, as in FIG. 1, or vice versa. FIG. 6 illustrates a configuration having only stringers, and no loops. FIG. 7 illustrates the configuration of the aforementioned patent, which may practice the invention by having the generally longitudinal stringers 50 formed of cord of a first color, and the generally transverse stringers 51 formed of cord of a color contrasting therewith, and the loops 52 could be of any color, all within the purview of the invention. FIG. 8 is similar to FIG. 7 except that the stringers are orthogonal instead of radial. In FIG. 8, only the end transverse stringers 54 need be a different color than all of the remaining stringers 55–56, or only the side, longitudinal stringers 55 need be a different color than the remaining stringers 54, 56 and 57. Or, all of the transverse stringers 54, 57 may be a different color from all of the longitudinal stringers 55, 56, within the purview of the invention. FIG. 9 is similar to FIG. 7, but with only certain of the longitudinal and transverse stringers extending beyond the net so as to take advantage of the hooks described with respect to FIGS. 1–3 hereinbefore. In FIG. 9, only the longitudinal stringers 60 which extend from the net need be of a color different from all the remaining stringers 61–63, or alternatively, only the transverse stringers 62 which extend from the net need to be of a color different from the remaining stringers 60, 61 and 63. Or, all of the longitudinal stringers 60, 61 may be of a different color than all of the transverse stringers 62, 63, and the loops 64 may be any color, all within the purview of the present invention. All of these configurations are irrelevant to the present invention, which simply comprises having at least a pair of longitudinal stringer of one color and at least a pair of transverse stringer of another color.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

I claim:

1. A cargo restraint for securing cargo to a cargo supporting device, comprising:

a plurality of longitudinal stringers formed of durable cord of a first color so as to be easily identifiable as the longitudinal stringers; and a plurality of transverse stringers formed of durable cord of a second color different from and contrasting with said first color so as to be easily identifiable as the transverse stringers, whereby the orientation of said restraint is easily determined.

2. A cargo restraint according to claim 1 wherein said stringers are formed of durable, elastic cord.

3. A cargo restraint according to claim 1 wherein said transverse stringers cross said longitudinal stringers and are fastened thereto where said stringers cross.

4. A cargo restraint according to claim 1 further comprising at least one loop of durable cord contacting all of said stringers and fastened thereto where they contact.

5. A cargo restraint according to claim 4 wherein said loop is the same color as one of said first and second colors.

6. A cargo restraint according to claim 4 wherein said loop is formed of durable, elastic cord.

7. A cargo restraint according to claim 4 wherein said loop crosses said stringers, said stringers extending outwardly beyond said loop.

8. A cargo restraint according to claim 7 further comprising a clasp on each end of said stringers which extend beyond said loop.

* * * * *